United States Patent
Inoue et al.

(10) Patent No.: US 10,890,134 B2
(45) Date of Patent: Jan. 12, 2021

(54) CONTROLLER AND CONTROL METHOD FOR INTERNAL COMBUSTION ENGINE INCLUDING PORT INJECTION VALVE THAT INJECTS FUEL INTO INTAKE PASSAGE

(71) Applicant: TOYOTA JIDOSHA KABUSHIKI KAISHA, Toyota (JP)

(72) Inventors: Takahiro Inoue, Toyota (JP); Masanori Toya, Toyota (JP); Takayuki Omachi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 16/359,916

(22) Filed: Mar. 20, 2019

(65) Prior Publication Data
US 2019/0331040 A1 Oct. 31, 2019

(30) Foreign Application Priority Data

Apr. 27, 2018 (JP) .................................. 2018-087745

(51) Int. Cl.
| | | |
|---|---|---|
| *F02D 41/40* | (2006.01) | |
| *F02D 41/06* | (2006.01) | |
| *F02D 41/18* | (2006.01) | |
| *F02D 41/26* | (2006.01) | |

(52) U.S. Cl.
CPC ......... *F02D 41/402* (2013.01); *F02D 41/061* (2013.01); *F02D 41/062* (2013.01); *F02D 41/182* (2013.01); *F02D 41/26* (2013.01)

(58) Field of Classification Search
CPC ...... F02D 41/062; F02D 41/182; F02D 41/26; F02D 41/064; F02D 41/065; F02D 41/047; F02D 2200/021; F02D 41/345; F02D 2250/38; F02D 41/34; F02D 41/04; F02D 2200/0616; F02D 41/402; F02D 41/061
See application file for complete search history.

(56) References Cited

U.S. PATENT DOCUMENTS

| | | | | |
|---|---|---|---|---|
| 4,543,937 A | * | 10/1985 | Amano ................. | F02D 41/061 123/491 |
| 6,062,201 A | * | 5/2000 | Nozawa .............. | F02D 13/0219 123/478 |
| 6,314,944 B1 | * | 11/2001 | Majima ................. | F02D 19/061 123/491 |

(Continued)

FOREIGN PATENT DOCUMENTS

| | | |
|---|---|---|
| JP | 2005-188293 A | 7/2005 |
| JP | 2007-263047 A | 10/2007 |

(Continued)

*Primary Examiner* — David Hamaoui
(74) *Attorney, Agent, or Firm* — Oliff PLC

(57) ABSTRACT

A port injection valve injects fuel into an intake passage. A controller increases a base injection amount over a predetermined period after the internal combustion engine is started and gradually decreases an increase correction ratio of the base injection amount. One of two processes, a multiple injection process and a single injection process, is selected in order to inject the increased base injection amount of fuel. The increase correction ratio is set to be a smaller value in the multiple injection process than in the single injection process.

9 Claims, 7 Drawing Sheets

(56) References Cited

U.S. PATENT DOCUMENTS

| | | | |
|---|---|---|---|
| 7,464,690 B1* | 12/2008 | Reitz | F02D 41/402 |
| | | | 123/299 |
| 9,255,541 B2* | 2/2016 | Surnilla | F02D 13/0219 |
| 9,970,379 B2* | 5/2018 | Zeng | F02D 41/3094 |
| 10,107,225 B2* | 10/2018 | Kitazume | F02D 41/047 |
| 10,227,946 B2* | 3/2019 | Kim | F02D 41/3076 |
| 2009/0234557 A1* | 9/2009 | Hirowatari | F02D 41/402 |
| | | | 701/103 |

FOREIGN PATENT DOCUMENTS

| | | |
|---|---|---|
| JP | 2007-332936 A | 12/2007 |
| JP | 2010-223063 A | 10/2010 |

* cited by examiner

CONTROLLER AND CONTROL METHOD FOR INTERNAL COMBUSTION ENGINE INCLUDING PORT INJECTION VALVE THAT INJECTS FUEL INTO INTAKE PASSAGE

BACKGROUND

1. Field

The following description relates to a controller and a control method for an internal combustion engine, the controller and the control method being applied to an internal combustion engine including a port injection valve that injects fuel into an intake passage.

2. Description of Related Art

In general, some of the fuel injected from a port injection valve collects on the wall of the intake passage instead of flowing into the combustion chamber. Japanese Laid-Open Patent Publication No. 2005-188293 describes an example of a controller that corrects the injection amount of fuel to be increased in accordance with the amount of such collected fuel. More specifically, paragraph [0044] of the document describes that the controller decreases an increased correction amount in accordance with the time elapsed after the engine is started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A controller for an internal combustion engine is provided. The internal combustion engine includes a port injection valve that injects fuel into an intake passage. The controller is configured to execute a base injection amount calculation process for calculating a base injection amount in accordance with an amount of fresh air filling a combustion chamber of the internal combustion engine, an increasing correction process for increasing the base injection amount over a predetermined period after the internal combustion engine is started and gradually decreasing an increase correction ratio of the base injection amount, and a fuel injection process for selecting and executing one of two processes, a multiple injection process and a single injection process, in order to inject the increased base injection amount of fuel. The multiple injection process is to sequentially execute an intake air synchronous injection and an intake air non-synchronous injection by operating the port injection valve in order from the intake air non-synchronous injection to the intake air synchronous injection. The single injection process is to inject the increased base injection amount of fuel by operating the port injection valve through the intake air non-synchronous injection. The intake air synchronous injection is to inject fuel in synchronization with an opening period of an intake valve. The intake air non-synchronous injection is to inject fuel at a more advanced timing than a timing of the intake air synchronous injection. The increasing correction process includes a differentiation process for setting the increase correction ratio to be a smaller value in the multiple injection process than in the single injection process.

In the above-described configuration, the base injection amount is corrected through the increase correction process over the predetermined period after the internal combustion engine is started. This limits deviation of the air-fuel ratio in the combustion chamber from an intended air-fuel ratio that results from the amount of fuel that collects in the intake passage and is not thus subject to combustion in the combustion chamber in a combustion cycle in the fuel injected from the port injection valve. In the above-described configuration, the intake non-synchronous injection and the intake synchronous injection are executed in the multiple injection process. Thus, the injection amount of the intake non-synchronous injection is smaller in the multiple injection process than in the single injection process. The amount of fuel that collects in the intake passage and is not thus subject to combustion in the combustion chamber in a combustion cycle in the fuel injected from the port injection valve tends to be smaller when the intake synchronous injection is performed than when the intake non-synchronous injection is performed. Thus, the amount of fuel that collects in the intake passage and is not thus subject to combustion in the combustion chamber in a combustion cycle in the fuel injected from the port injection valve tends to be smaller when the multiple injection process is executed than when the single injection process is executed. In the above-described configuration, the differentiation process is performed to set the increase correction ratio obtained through the increasing correction process to be smaller in the multiple injection process than in the single injection process. Accordingly, the increase correction ratio obtained through the increasing correction process is set to be an acceptable value to set the air-fuel ratio to be a target air-fuel ratio both in the single injection process and the multiple injection process.

The inventor found that the particle number (PN) of particulate matter (PM) may be large in the single injection process, in which the amount of fuel to be supplied to each cylinder from the port injection valve in a single combustion cycle is injected through a single fuel injection. Thus, the inventor considered using the multiple injection process and the single injection process in combination. In the multiple injection process, the amount of fuel to be supplied to each cylinder from the port injection valve in a single combustion cycle is split and injected through the intake synchronous injection and the intake non-synchronous injection. The intake air synchronous injection is to inject fuel in synchronization with the opening period of the intake valve, and the intake air non-synchronous injection is to inject fuel at a more advanced timing than that of the intake air synchronous injection. However, if an acceptable value of the increase correction amount for one of the single injection process and the multiple injection process is applied to the remaining processes, the air-fuel ratio in the combustion chamber may be deviated from a target value. The above-described configuration limits such a problem.

Example 2: In the controller according to example 1, the increasing correction process includes a stop time reflection process for setting the increase correction ratio to be a larger value when a time between a start timing of the internal combustion engine and a stop timing of the internal combustion engine, which is immediately before the start timing, is long than when the time is short.

When the time interval is short, some of the fuel that collected in the intake passage the last time the internal combustion engine was running still exists in the intake passage when starting the internal combustion engine. In particular, the amount of fuel that remains in the intake passage is larger when the time interval is short than when the time interval is long. In the above-described configuration, the increase correction ratio is set to be a larger value through the stop time reflection process when the time interval is long than when the time interval is short. That is, the increase correction ratio is set to be a smaller value when the time interval is short than when the time interval is long. Thus, the increase correction ratio is calculated in accordance with the amount of fuel that remains in the intake passage when the internal combustion engine is started.

Example 3: In the controller according to example 1 or 2, the increasing correction process includes a rotation correction process for setting the increase correction ratio to be a smaller value when a rotation speed of a crankshaft of the internal combustion engine is high than when the rotation speed is low.

The flow speed of air in the intake passage tends to be higher when the rotation speed of the crankshaft of the internal combustion engine is high than when the rotation speed is low. This decreases the amount of fuel that collects and remains in the intake passage. In the above-described configuration, the increase correction ratio is set to be a smaller value through the rotation correction process when the rotation speed is high than when the rotation speed is low. Thus, the value of the increase correction ratio is set to be more acceptable in accordance with the rotation speed.

Example 4: In the controller according to any one of examples 1 to 3, the increasing correction process includes a process for setting the increase correction ratio to be a smaller value when an injection start timing of the intake air non-synchronous injection is advanced than when the injection start timing is retarded.

The time interval from the fuel injection start timing to the closing timing of the intake valve tends to be longer when the injection start timing of the intake non-synchronous injection is advanced than when the injection start timing of the intake non-synchronous injection is retarded. Thus, fuel is easily atomized and flows into the combustion chamber. In the above-described configuration, the increase correction ratio is set to be a smaller value when the injection start timing of the intake non-synchronous injection is advanced than when the injection start timing of the intake non-synchronous injection is retarded. Thus, the value of the increase correction ratio is set to be more acceptable in accordance with the injection start timing.

Example 5: In the controller according to any one of examples 1 to 4, the controller is further configured to execute, in addition to the increasing correction process, a low-temperature increasing process for increasing the base injection amount to be larger when a temperature of the internal combustion engine is low than when the temperature is high in a case in which the temperature of the internal combustion engine is less than or equal to a preset temperature.

When the temperature of the internal combustion engine is low, the proportion of fuel to be burned tends to be small in the fuel that is injected from the port injection valve and flows into the combustion chamber. In the above-described configuration, the low-temperature increasing process is executed. Thus, even when the temperature of the internal combustion engine is low, the amount of fuel to be burned in the combustion chamber is set to be an acceptable value.

Example 6: In the controller according to any one of examples 1 to 5, the increasing correction process includes an initial value calculation process for calculating an initial value of the increase correction ratio, an updating process for updating the increase correction ratio by gradually decreasing the initial value as a number of times injection from the port injection valve is performed increases, and a correction process for correcting the base injection amount based on the increase correction ratio. The multiple injection process is a process for splitting the increased base injection amount of fuel into fuel injected through the intake air non-synchronous injection and fuel injected through the intake air synchronous injection and injecting the fuel injected through the intake air non-synchronous injection and the fuel injected through the intake air synchronous injection.

In the above-described configuration, the updating process is performed to gradually decrease the increase correction ratio properly.

Example 7: In the controller according to any one of examples 1 to 6, the single injection process is a process for operating the port injection valve such that a center of an injection period of the intake air non-synchronous injection is prior to an open timing of the intake valve.

In the above-described configuration, fuel is injected as quickly as possible in the single injection process. This ensures the time for fuel to be atomized.

Example 8: A control method for controlling an internal combustion engine executes the processes described in examples 1 to 7.

Example 9: A non-transitory computer-readable storage medium that stores a program causing a processor to execute the control processes described in examples 1 to 7.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for an internal combustion engine according to an embodiment will now be described with reference to the drawings.

Figure 1:
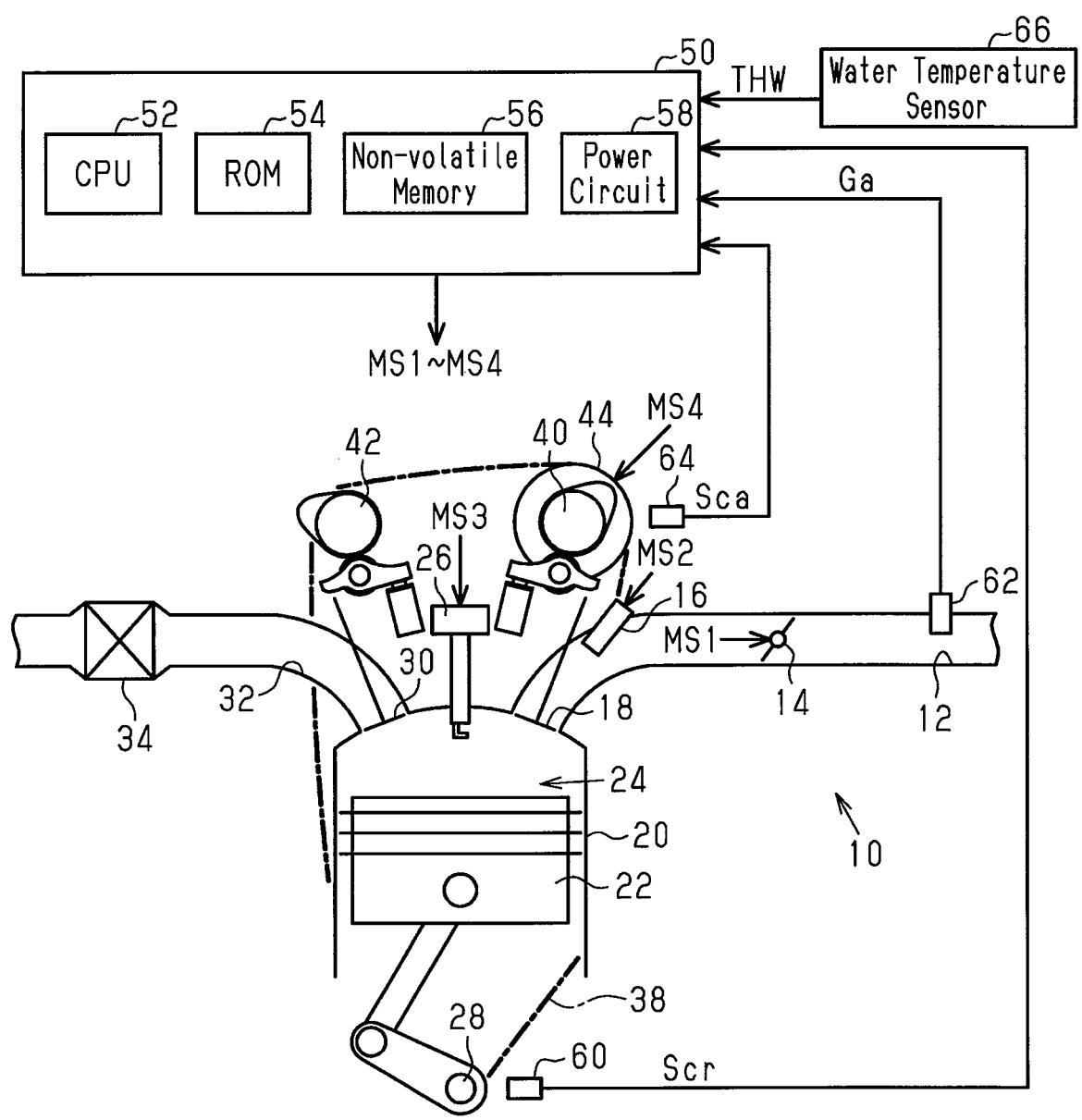
FIG. 1 is a diagram showing a controller and an internal combustion engine according to an embodiment of the present disclosure.

The internal combustion engine 10 shown in FIG. 1 includes an intake passage 12. The intake passage 12 includes a throttle valve 14. A port injection valve 16 is arranged on the downstream side of the throttle valve 14. When an intake valve 18 opens, air drawn into the intake passage 12 and fuel injected from the port injection valve 16 flow into a combustion chamber 24, which is defined by a cylinder 20 and a piston 22. In the combustion chamber 24, the mixture of the fuel and the air is burned through spark discharge performed by an ignition device 26. Energy generated through the burning is converted by the piston 22 into rotation energy of a crankshaft 28. When an exhaust valve 30 opens, the burned mixture is discharged to an exhaust passage 32 as exhaust gas. The exhaust passage 32 includes a catalyst 34.

The rotating power of the crankshaft 28 is transmitted through a timing chain 38 to an intake camshaft 40 and an exhaust camshaft 42. In the present embodiment, the power of the timing chain 38 is transmitted to the intake camshaft 40 through an intake valve timing adjusting device 44. The intake valve timing adjusting device 44 is an actuator that adjusts the open timing of the intake valve 18 by adjusting the difference in rotation phase between the crankshaft 28 and the intake camshaft 40.

The control subject of the controller 50 is the internal combustion engine 10. In order to control, for example, the control amount of the internal combustion engine 10, that is, torque and exhaust components, the controller 50 operates the operation units of the internal combustion engine 10 such as the throttle valve 14, the port injection valve 16, the ignition device 26, and the intake valve timing adjusting device 44. When operating the operation units, the controller 50 refers to an output signal Scr of a crank angle sensor 60, an intake air amount Ga detected by an airflow meter 62, an output signal Sca of an intake cam angle sensor 64, and the temperature (water temperature THW) of coolant in the internal combustion engine 10 detected by a water temperature sensor 66.

The controller 50 includes a CPU 52, a ROM 54, an electrically-rewritable non-volatile memory 56, and a power circuit 58 that supplies power to each section in the controller 50. When the CPU 52 executes programs stored in the ROM 54, the controller 50 controls the above-described control amount.

Figure 2:
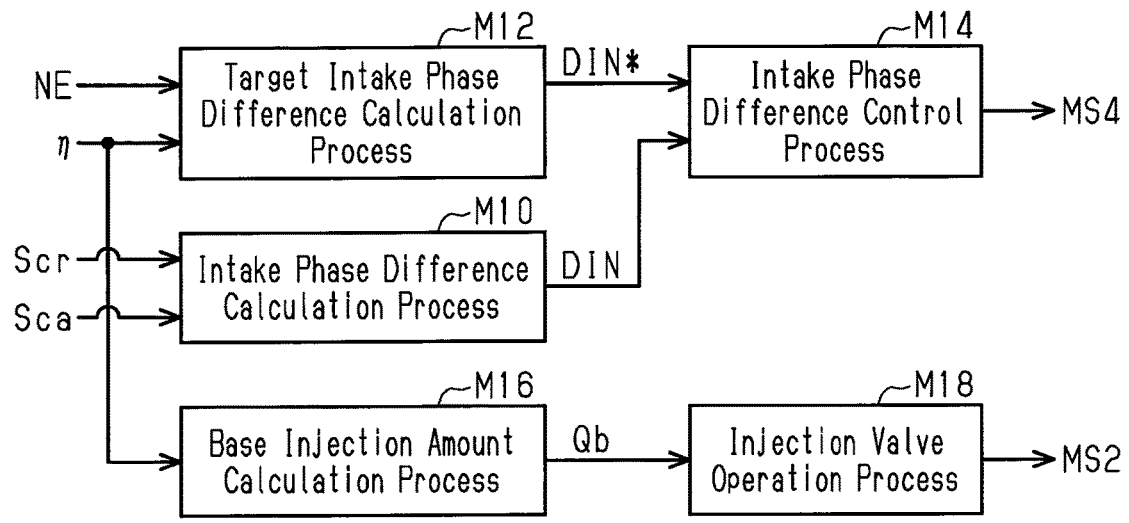
FIG. 2 is a block diagram illustrating some of the processes executed by the controller in the internal combustion engine shown in FIG. 1.

FIG. 2 illustrates some of the processes executed by the controller 50. The processes illustrated in FIG. 2 are implemented when the CPU 52 executes programs stored in the ROM 54.

An intake phase difference calculation process M10 is a process for calculating an intake phase difference DIN, which is the phase difference in the rotation angle of the intake camshaft 40 from the rotation angle of the crankshaft 28, based on the output signal Scr of the crank angle sensor 60 and the output signal Sca of the intake cam angle sensor 64. A target intake phase difference calculation process M12 is a process for variably setting a target intake phase difference DIN* based on the operating point of the internal combustion engine 10. In the present embodiment, a rotation speed NE and a charging efficiency $\eta$ are used to define the operating point of the internal combustion engine 10. The CPU 52 calculates the rotation speed NE based on the output signal Scr of the crank angle sensor 60 and calculates the charging efficiency $\eta$ based on the rotation speed NE and the intake air amount Ga. The charging efficiency $\eta$ is a parameter that determines the amount of fresh air filling the combustion chamber 24.

An intake phase difference control process M14 is a process for outputting an operation signal MS4 to operate the intake valve timing adjusting device 44 in order to control the intake phase difference DIN to the target intake phase difference DIN*.

A base injection amount calculation process M16 is a process for calculating a base injection amount Qb, which is the base value of the amount of fuel used to set the air-fuel ratio of mixture in the combustion chamber 24 to a target air-fuel ratio, based on the charging efficiency $\eta$. The base injection amount Qb is the amount of fuel calculated to control the air-fuel ratio to the target air-fuel ratio based on the amount of fresh air filling the combustion chamber 24. For example, the target air-fuel ratio may be a stoichiometric air-fuel ratio.

An injection valve operation process M18 is a process for outputting an operation signal MS2 to the port injection valve 16 in order to operate the port injection valve 16 based on the base injection amount Qb.

Figure 3:
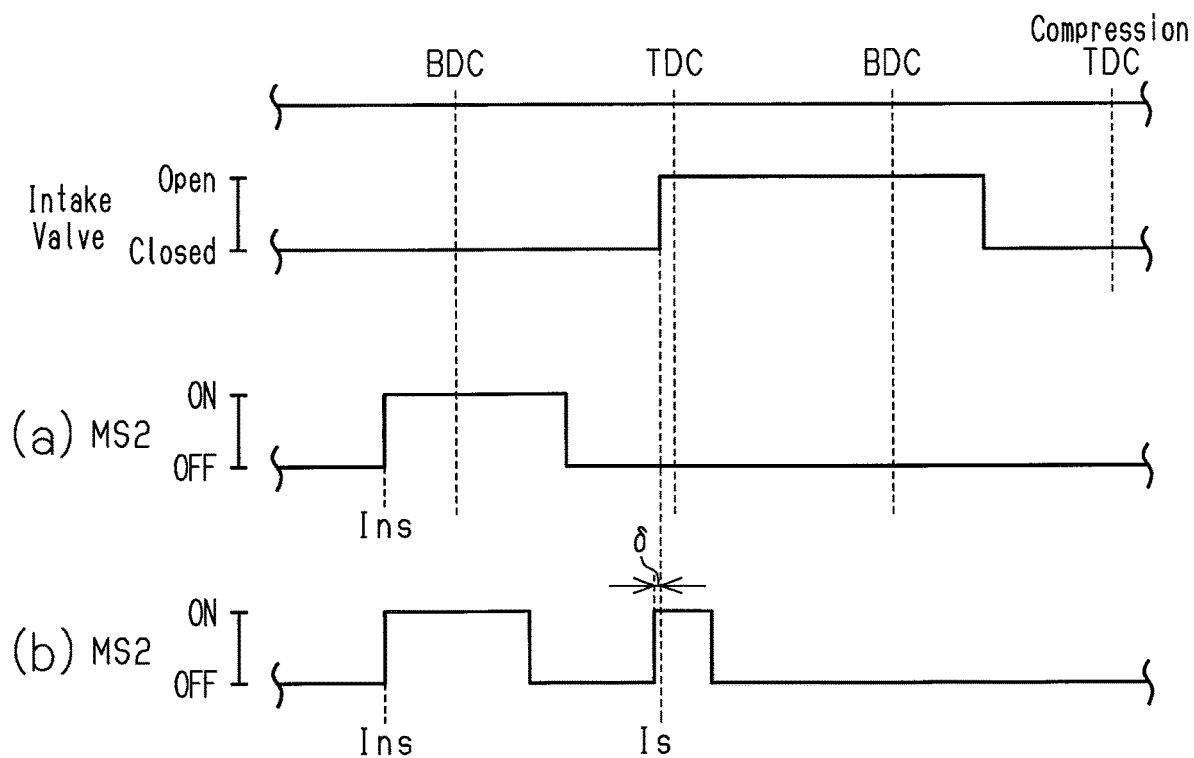
FIG. 3 is a time chart including sections (a) and (b), which respectively illustrate a single injection process and a multiple injection process in the internal combustion engine shown in FIG. 1.

In the present embodiment, the fuel injection process includes two processes, namely, a process described in section (a) of FIG. 3 and a process described in section (b) of FIG. 3.

In FIG. 3, section (a) illustrates a single injection process for starting fuel injection before the intake valve 18 opens and executing a single injection that ends fuel injection before the intake valve 18 opens.

In FIG. 3, section (b) illustrates a multiple injection process for executing two types of fuel injections, namely, an intake air synchronous injection of starting fuel injection at a synchronous injection start timing Is in synchronization with the opening period of the intake valve 18 and an intake air non-synchronous injection of starting fuel injection at a non-synchronous injection start timing Ins, which is more advanced than the timing of the intake air synchronous injection. In FIG. 3, the dotted line extending over sections (a) and (b) indicates the open timing of the intake valve 18. In the present embodiment, the synchronous injection start timing Is is set to be more advanced than the open timing of the intake valve 18 by a micro-time S. The micro-time 6 is set to a time for fuel injected from the port injection valve 16 to reach the position of the intake valve 18 before opening. This setting causes the injected fuel to flow into the combustion chamber 24 as quickly as possible when the intake valve 18 opens. Since the process illustrated in section (a) of FIG. 3 is a process of executing only the intake air non-synchronous injection, the injection start timing is described as the "non-synchronous injection start timing Ins."

In the present embodiment, the multiple injection process is executed in order to reduce PN. That is, in a case in which the single injection process is executed when the water temperature THW is relatively low and the charging efficiency η is relatively high, PN tends to increase. This may be because since the base injection amount Qb is larger when the charging efficiency η is high than when the charging efficiency η is low, the amount of fuel collecting in the intake passage 12 increases. More specifically, when the amount of fuel collecting in the intake passage 12 is relatively large, shearing of the collected fuel may cause part of the collected fuel to flow into the combustion chamber 24 as liquid drops. In the present embodiment, the base injection amount Qb of fuel is partially injected through the intake air synchronous injection when the charging efficiency η is relatively high. Thus, whereas the base injection amount Qb is large, the amount of fuel collecting in the intake passage 12 can be reduced, thereby reducing PN.

Figure 4:
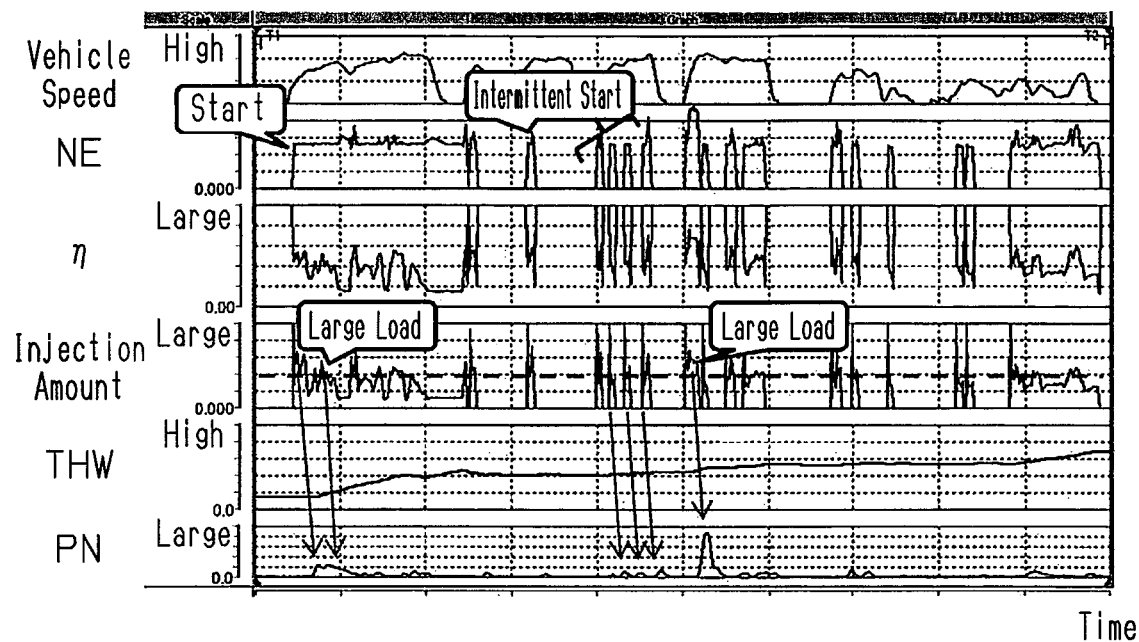
FIG. 4 is a time chart illustrating the problem to be solved in the internal combustion engine shown in FIG. 1.

FIG. 4 illustrates the changes of the vehicle speed, the rotation speed NE, the charging efficiency the amount of injection, the water temperature THW, and PN when only the intake air non-synchronous injection illustrated in section (a) of FIG. 3 is executed.

Figure 5:
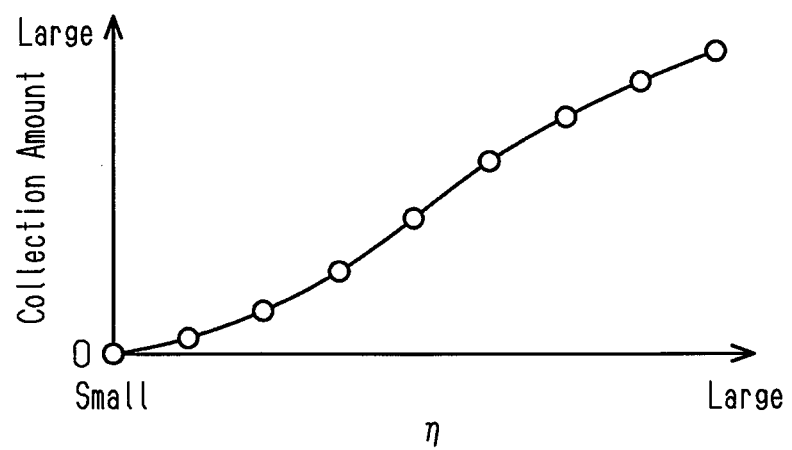
FIG. 5 is a graph illustrating the relationship between a charging efficiency and the amount of fuel collecting in an intake passage in the internal combustion engine shown in FIG. 1.

As shown in FIG. 4, PN increases when the water temperature THW is relatively low and the engine 10 is started, and PN increases when the water temperature THW is relatively low and the charging efficiency η is relatively high. FIG. 5 illustrates the relationship between the charging efficiency η and the amount of fuel collecting in the intake passage 12. As shown in FIG. 5, the higher the charging efficiency it the larger the amount of collection becomes. This supports the inference that PN increases when the charging efficiency η is high because the amount of fuel collecting in the intake passage 12 becomes large.

The fuel injection control of the internal combustion engine 10 in the present embodiment executed to reduce PN will now be described in detail.

Figure 6:
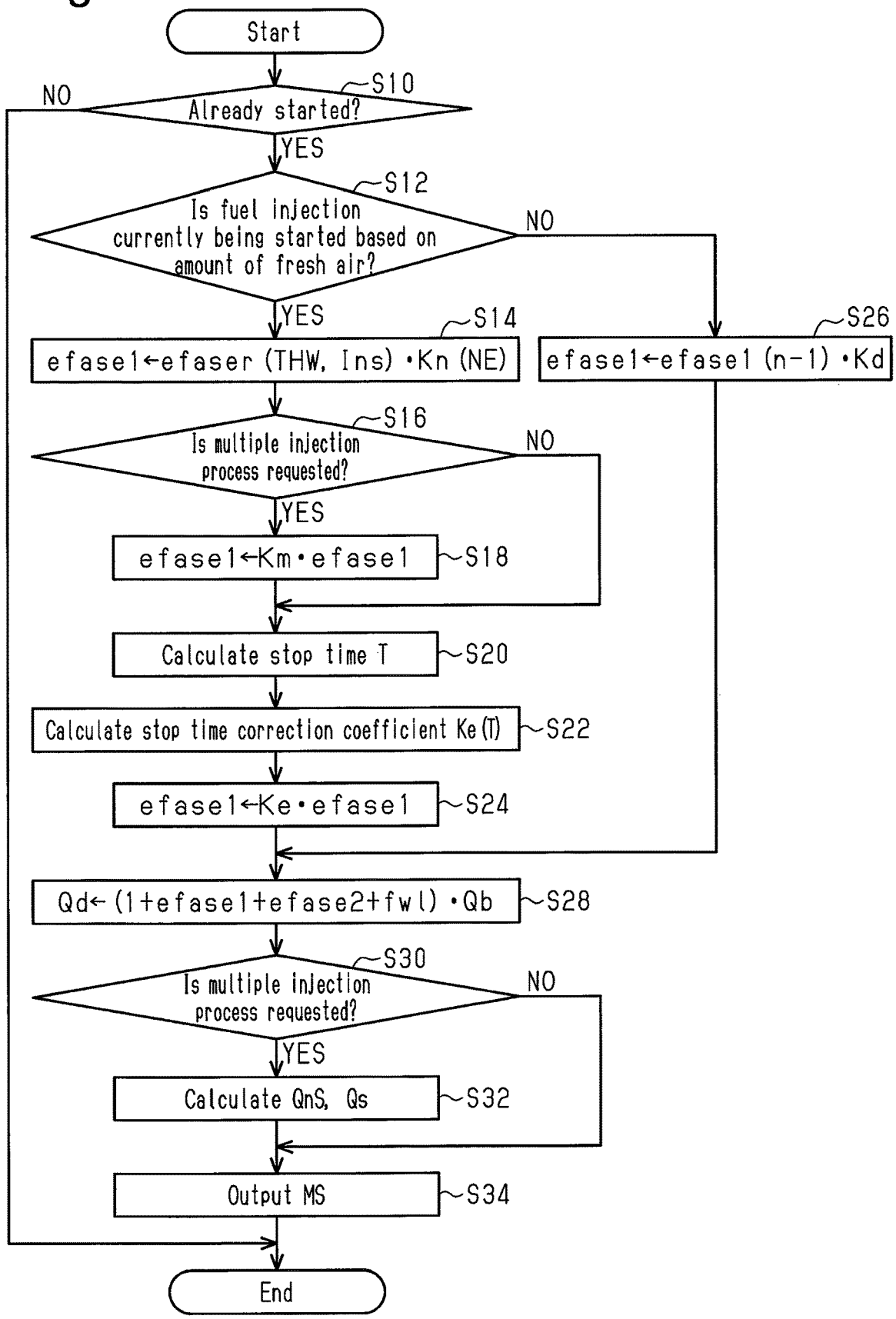
FIG. 6 is a flowchart illustrating the procedures of an injection valve operation process in the internal combustion engine shown in FIG. 1.

FIG. 6 illustrates the procedures of processes of the injection valve operation process M18. The processes illustrated in FIG. 6 are implemented when the CPU 52 repeatedly executes the program stored in the ROM 54, for example, in a predetermined cycle. In the following description, the step number of each process is represented by a number in front of which the character S is given.

In a series of processes illustrated in FIG. 6, the CPU 52 first determines whether or not the engine 10 has already been started (S10), which refers to the point in time at which the detection accuracy of the intake air amount Ga detected by the airflow meter 62 has reached a permissive value and the calculation accuracy of the base injection amount Qb has reached a permissive value after starting rotation of the crankshaft 28. In the present embodiment, before reaching the permissive value, the fuel injected from the port injection valve 16 is determined only from the water temperature THW, not in accordance with the base injection amount Qb. More specifically, the CPU 52 sets the amount of fuel injected from the port injection valve 16 to be larger when the water temperature THW is low than when the water temperature THW is high.

When the CPU 52 determines that the engine 10 has already been started (S10: YES), the CPU 52 determines whether or not fuel injection is currently being started based on the amount of fresh air filling the combustion chamber 24 (S12). When the CPU 52 makes a negative determination in the process of S10 in the last control cycle of the series of processes illustrated in FIG. 6 and makes an affirmative determination in the current control cycle, the CPU 52 determines that fuel injection is currently being started based on the amount of fresh air filling the combustion chamber 24.

When the CPU 52 determines that fuel injection is currently being started based on the amount of fresh air filling the combustion chamber 24 (S12: YES), the CPU 52 sets the initial value of a wall surface collection amount increase ratio efase1 (hereinafter referred to as collection amount increase ratio efase1) (S14). The collection amount increase ratio efase1 is a correction ratio obtained through feed-forward control of the base injection amount Qb. The collection amount increase ratio efase1 is used to compensate for the lack of the amount of fuel supplied into the combustion chamber 24 relative to the base injection amount Qb, the lack occurring when the fuel injected from the port injection valve 16 partially collects in the intake passage 12 and thus does not flow into the combustion chamber 24.

Figure 7:
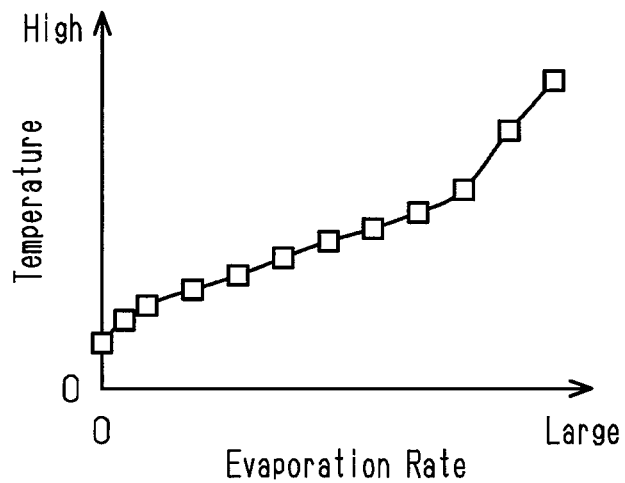
FIG. 7 is a graph illustrating the relationship between the temperature of coolant in the internal combustion engine shown in FIG. 1 and the evaporation rate of fuel in the internal combustion engine.

More specifically, the CPU 52 first calculates a reference value efaser of the collection amount increase ratio efase1 based on the water temperature THW and the non-synchronous injection start timing Ins. The CPU 52 sets the reference value efaser to be larger when the water temperature THW is low than when the water temperature THW is high. The calculation is performed in this manner because the evaporation rate of fuel is lower when the temperature is low than when the temperature is high as shown in FIG. 7. The evaporation rate is a rate at which liquid fuel evaporates per unit of time. The evaporation rate is lower when the temperature in the intake passage 12 and the temperature of fuel are low than when the temperatures are high. Thus, the amount of fuel that is not to be supplied into the combustion chamber 24 in a combustion cycle in the fuel collecting in the port injection valve 16 becomes large.

Further, the amount of fuel that collects in the intake passage 12 and is thus not supplied into the combustion chamber 24 becomes larger when the non-synchronous injection start timing Ins is retarded than when the non-synchronous injection start timing Ins is advanced. Taking this into account, the CPU 52 sets the reference value efaser to be larger when the non-synchronous injection start timing Ins is retarded than when the non-synchronous injection start timing Ins is advanced.

More specifically, the CPU 52 performs map calculation for the reference value efaser in a state in which the ROM 54 already stores map data that includes the water temperature THW and the non-synchronous injection start timing Ins as input variables and the reference value efaser as an output variable. Map data refers to a set of data including the discrete values of input invariables and the values of output variables that respectively correspond to the values of the input variables. In the map calculation, for example, when the value of an input variable coincides with any one of the input variables of map data, the value of the corresponding output variable of the map data is treated as a calculation result. Further, when such a coincidence does not occur, a value obtained through interpolation of the output variables included in the map data is treated as a calculation result.

Figure 8:
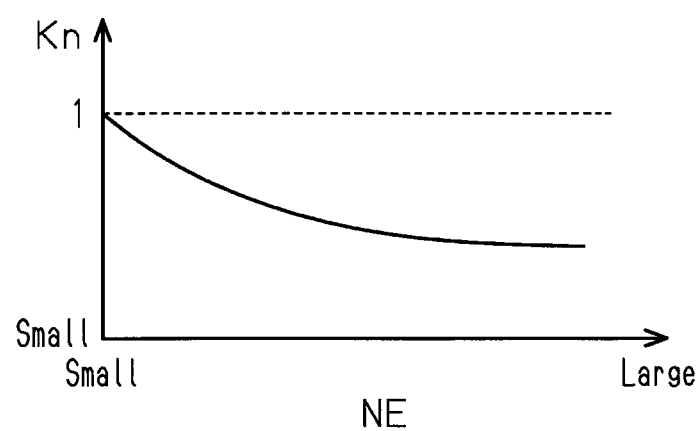
FIG. 8 is a graph illustrating the tendency of a rotation correction coefficient in the internal combustion engine shown in FIG. 1.

The CPU 52 calculates a rotation correction coefficient Kn relative to the reference value efaser based on the rotation speed NE. As shown in FIG. 8, in order to decrease the reference value efaser, the CPU 52 sets the rotation correction coefficient Kn to be smaller when the rotation speed NE is high than when the rotation speed NE is low. This setting is made because the flow rate of air in the intake passage 12 is higher and the amount of fuel collecting in the intake passage 12 is smaller when the rotation speed NE is high than when the rotation speed NE is low. More specifically, the CPU 52 performs map calculation for the rotation correction coefficient Kn in a state in which the ROM 54 already stores map data that includes the rotation speed NE as an input variable and the rotation correction coefficient Kn as an output variable.

As shown in FIG. 6, the CPU 52 substitutes the value obtained by multiplying the reference value efaser by the rotation correction coefficient Kn for the collection amount increase ratio efase1.

Subsequently, the CPU 52 determines whether or not the multiple injection process is requested (S16). When the logical conjunction of condition (i) that the water temperature THW is less than or equal to a preset temperature (for example, 70° C.), condition (ii) that the charging efficiency η is greater than or equal to a preset value, and condition (iii) that the charging efficiency η is less than or equal to a predetermined value, which is greater than the preset value, is true, the CPU 52 determines that execution of the multiple injection process is requested. The predetermined value in condition (iii) may be set to be a charging efficiency value that can be usually obtained only when the rotation speed NE is greater than or equal to a predetermined speed. The predetermined value is set to ensure the time interval between the synchronous injection start timing Is and the injection end timing of the intake air non-synchronous injection.

When the multiple injection process is requested (S16: YES), the CPU 52 substitutes a value obtained by multiplying the collection amount increase ratio efase1 by a multiple injection correction coefficient Km into the collection amount increase ratio efase1 (S18). This process is performed because differences occur in the amount of fuel collecting in the intake passage 12 between the single injection process and the multiple injection process.

Figure 9:
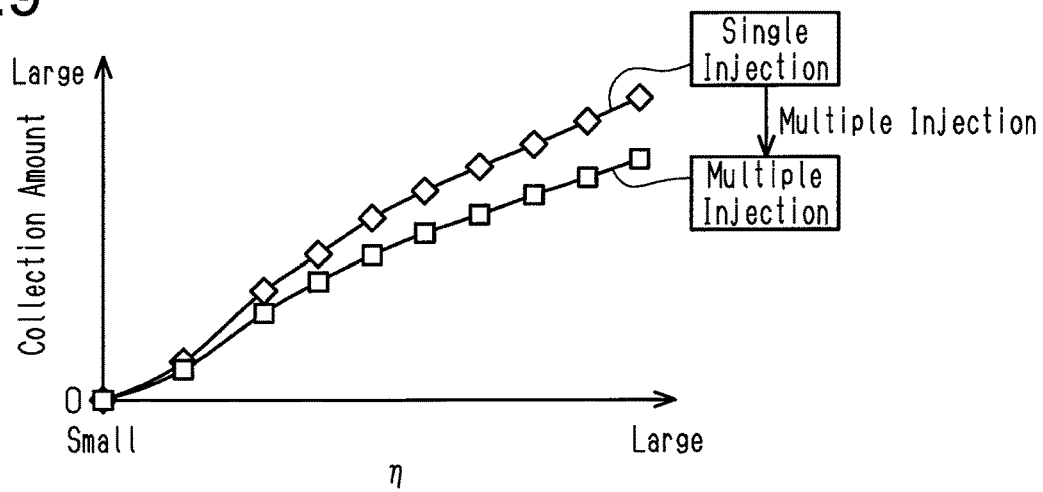
FIG. 9 is a graph illustrating the difference in the amount of fuel collecting on the wall surface of the intake passage between the single injection process and the multiple injection process in the internal combustion engine shown in FIG. 1.

FIG. 9 shows the relationship between the charging efficiency η and the amount of fuel collecting on the wall surface of the intake passage 12 in the single injection process and the multiple injection process. As shown in FIG. 9, whereas the collection amount is larger when the charging efficiency η is high than when charging efficiency η is low both in the single injection process and the multiple injection process, the collection amount is larger in the single injection process than in the multiple injection process when the charging efficiency η is the same. In the present embodiment, the initial value calculated through the process of S14 is adapted for the single injection process. When the multiple injection process is executed, the initial value of the collection amount increase ratio efase1 calculated in the process of S14 is corrected to be reduced by the multiple injection correction coefficient Km, which is less than 1.

When the CPU 52 completes the process of S18 or makes a negative determination in the process of S16, the CPU 52 calculates a stop time T. The stop time T is a time between the current start timing of the internal combustion engine 10 and the stop timing of the internal combustion engine 10, which is immediately before the current start timing (S20). This process can be performed in a case in which the CPU 52 stores the time of stopping the internal combustion engine 10 in the non-volatile memory 56 when the internal combustion engine 10 is stopped. Then, the CPU 52 calculates a stop time correction coefficient Ke for the collection amount increase ratio efase1 based on the stop time T (S22). In a case in which the stop time T is short, when the internal combustion engine 10 is running, the fuel collecting in the intake passage 12 remains. Thus, the collection amount increase ratio efase1 calculated through the processes of S14 and S18 becomes excessively large for an increased ratio that compensates for the lack of the base injection amount Qb. For this reason, the process of S22 is executed.

Figure 10:
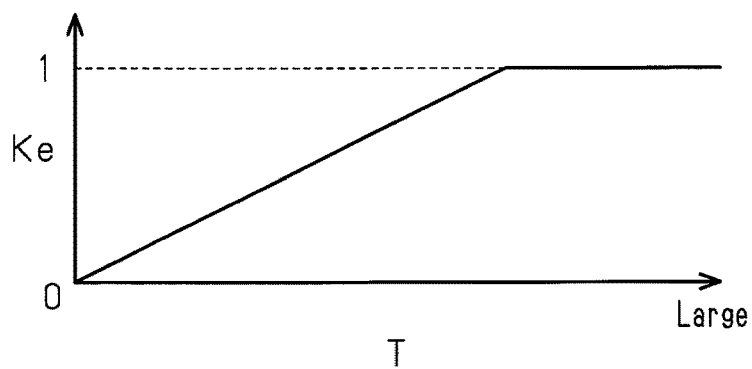
FIG. 10 is a graph illustrating the tendency of a stop time correction coefficient in the internal combustion engine shown in FIG. 1.

As shown in FIG. 10, the CPU 52 sets the stop time correction coefficient Ke to be larger when the stop time T is long than when the stop time T is short. The stop time correction coefficient Ke is greater than or equal to 0 and less than or equal to 1. When the stop time T is relatively long, the stop time correction coefficient Ke is 1. This process is achieved when the CPU 52 performs map calculation for the stop time correction coefficient Ke in a state in which the ROM 54 already stores map data that includes the stop time T as an input variable and the stop time correction coefficient Ke as an output variable.

Referring back to FIG. 6, the CPU 52 substitutes a value obtained by multiplying the collection amount increase ratio efase1 by the stop time correction coefficient Ke into the collection amount increase ratio efase1 to correct the collection amount increase ratio efase1 (S24).

When the CPU 52 makes a negative determination in the process of S12, the CPU 52 substitutes a value obtained by multiplying the collection amount increase ratio efase1 by a damping coefficient Kd into the collection amount increase ratio efase1 (S26). The damping coefficient Kd is less than 1 and greater than 0. The damping coefficient Kd is used to simulate gradual decreases in the amount of fuel that is not burned in the combustion chamber 24 in a combustion cycle because of the collection of fuel in the intake passage 12 in the fuel injected from the port injection valve 16, the gradual decreases being caused by increases in the number of times injection is performed.

When the CPU 52 completes the process of S24 or S26, the CPU 52 calculates a requested injection amount Qd, which is the amount of fuel requested to be injected from the port injection valve 16 into a single cylinder in a single combustion cycle (S28). The CPU 52 adds the collection amount increase ratio efase1, a torque step limiting increase ratio efase2, and a low-temperature increase ratio fw1 to 1, multiplies the sum by the base injection amount Qb, and then substitutes the multiplied value into the requested injection amount Qd. The low-temperature increase ratio fw1 is a correction ratio used to correct the base injection amount Qb to be increased through feed-forward control because the proportion of fuel to be burned is small in the fuel that flows into the combustion chamber 24 when the temperature of the internal combustion engine 10 is low. More specifically, the CPU 52 sets the low-temperature increase ratio fw1 to be greater than 0 when the water temperature THW is less than or equal to a predetermined temperature (for example, 70° C.), and the CPU 52 sets the low-temperature increase ratio fw1 to be 0 when the water temperature THW exceeds the predetermined temperature. In particular, in a case in which the water temperature THW is less than or equal to the predetermined temperature, the CPU 52 sets the low-temperature increase ratio fw1 to be larger when the water temperature THW is low than when the water temperature THW is high. This process is achieved when the CPU 52 performs map calculation for the low-temperature increase ratio fw1 in a state in which the ROM 54 already stores map data that includes the water temperature THW as an input variable and the low-temperature increase ratio fw1 as an output variable.

In addition, the torque step limiting increase ratio efase2 is used to limit sudden changes in the torque of the internal combustion engine 10 that are caused by changes in the injection amount resulting from switching from a state in which a negative determination is made to a state in which an affirmative determination is made in the process of S10. That is, when a negative determination is made in S10, the CPU 52 causes the port injection valve 16 to perform injection by determining the injection amount based on the water temperature THW regardless of the base injection amount Qb. In this case, the fuel amount is set to be excessive to prevent misfire. Thus, immediately after the requested injection amount Qd starts to be set based on the base injection amount Qb, the amount of fuel injected from the port injection valve 16 may suddenly decrease and the shaft torque of the internal combustion engine 10 may suddenly decrease. In the present embodiment, the torque step limiting increase ratio efase2 is used to correct the base injection amount Qb to be increased.

Figure 11:
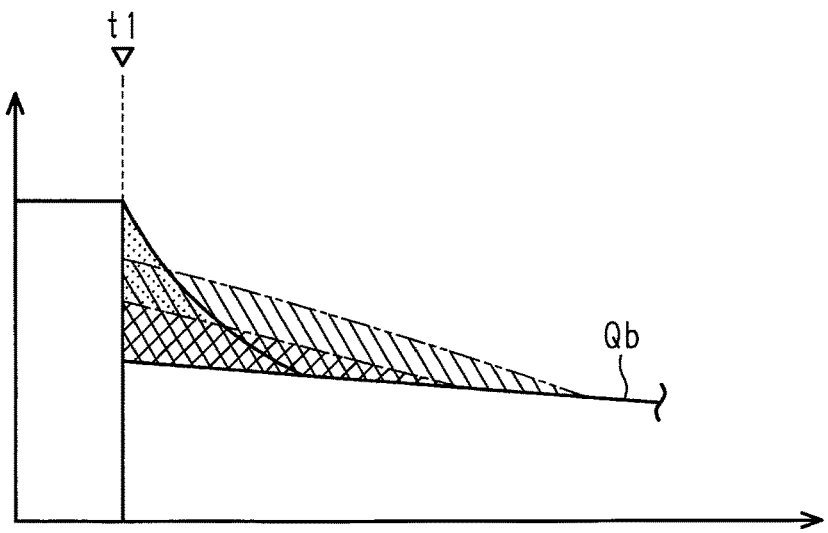
FIG. 11 is a time chart illustrating a torque step limiting increase ratio in the internal combustion engine shown in FIG. 1.

More specifically, as the dotted region in FIG. 11 shows the increased correction amount of the base injection amount Qb by the torque step limiting increase ratio efase2, the torque step limiting increase ratio efase2 is a parameter that gradually decreases as time (horizontal axis in FIG. 11) elapses. Subsequent to time t1 in FIG. 11, fuel injection is executed based on the base injection amount Qb. In FIG. 11, the difference between the long dashed double-short dashed line and the base injection amount Qb indicates the increased correction amount of the base injection amount Qb by the collection amount increase ratio efase1, and the difference between the long dashed short dashed line and the base injection amount Qb indicates the increased correction amount of the base injection amount Qb by the value obtained by multiplying the collection amount increase ratio efase1 by the multiple injection correction coefficient Km. In FIG. 11, the low-temperature increase ratio fw1 is not taken into account, and the multiple injection process is being hypothetically performed.

Referring back to FIG. 6, the CPU 52 determines whether or not the multiple injection process is requested (S30). When the CPU 52 determines that the multiple injection process is requested (S30: YES), the CPU 52 calculates a non-synchronous injection amount Qns, which is the injection amount of the intake air non-synchronous injection, and a synchronous injection amount Qs, which is the injection amount of the intake air synchronous injection (S32). The CPU 52 splits the requested injection amount Qd in accordance with the rotation speed NE, the charging efficiency it the water temperature THW, and the intake phase difference DIN. More specifically, the CPU 52 performs map calculation for the synchronous injection amount Qs in a state in which the ROM 54 already stores map data that includes the rotation speed NE, the charging efficiency the water temperature THW, and the intake phase difference DIN as input variables and the synchronous injection amount Qs as an output variable. The CPU 52 sets the non-synchronous injection amount Qns to be a value obtained by subtracting the synchronous injection amount Qs from the requested injection amount Qd.

Then, the CPU 52 operates the port injection valve 16 by outputting an operation signal MS2 to the port injection valve 16 in order to inject the non-synchronous injection amount Qns of fuel at the non-synchronous injection start timing Ins and inject the synchronous injection amount Qs of fuel at the synchronous injection start timing Is (S34). When the CPU 52 makes a negative determination in the process of S30, the CPU 52 operates the port injection valve 16 by outputting the operation signal MS2 to the port injection valve 16 in order to inject the requested injection amount Qd of fuel through a single fuel injection at the non-synchronous injection start timing Ins (S34).

When the CPU 52 completes the process of S34 or makes a negative determination in the process of S10, the CPU 52 ends the series of processes illustrated in FIG. 6.

The operation and advantages of the present embodiment will now be described.

When the internal combustion engine 10 is started to start the execution of fuel injection based on the base injection amount Qb, the CPU 52 determines the initial value of the collection amount increase ratio efase1. The CPU 52 sets the initial value to be smaller when the multiple injection process is executed than when the single injection process is executed. Thus, a suitable initial value can be set both in the multiple injection process and the single injection process.

In addition, the CPU 52 sets the initial value of the collection amount increase ratio efase1 to be smaller when the stop time T of the internal combustion engine 10 is short than when the stop time T is long. Thus, the CPU 52 sets the initial value to be smaller in a case in which a large amount of fuel that collected in the intake passage 12 the last time the internal combustion engine 10 was running still exists in the intake passage 12 when starting the internal combustion engine 10 than in a case in which a small amount of the fuel still exists. Thus, even when the stop time T is short, the initial value of the collection amount increase ratio efase1 is set to be suitable in accordance with the amount of fuel that still exists in the intake passage 12.

Correspondence

The correspondence between the matters in the above-described embodiment and the matters described in the section SUMMARY is as follows. Hereinafter, the correspondence relationship is shown for every number in the example described in the section SUMMARY.

[1] The increasing correction process corresponds to the processes of S12 to S28. The fuel injection process corresponds to the processes of S30 to S34. The differentiation process corresponds to the process of S18.

[2] The stop time reflection process corresponds to the processes of S20 and S22.

[3] The rotation correction process corresponds to using the rotation correction coefficient Kn in the process of S14.

[4] Example 4 corresponds to variably setting the reference value efaser in accordance with the non-synchronous injection start timing Ins in the process of S14.

[5] Example 5 corresponds to using the low-temperature increase ratio fw1 in the process of S28.

[6] The initial value calculation process corresponds to the process of S14, the updating process corresponds to the process of S26, and the correction process corresponds to the process of S28.

[7] Example 7 corresponds to section (a) of FIG. 3.

Modifications

The present embodiment may be modified as described below. The present embodiment and the following modifications may be implemented in combination with each other as long as technical contradiction does not occur.

Differentiation Process

In the above-described embodiment, the process of correcting the collection amount increase ratio efase1 using the multiple injection correction coefficient Km is performed to implement the differentiation process, which differentiates the single injection process from the multiple injection process. Instead, for example, the reference value efaser used in the process of S14 may be calculated separately for the multiple injection process and the single injection process. This can be implemented, for example, when map data in which the relationship of the water temperature THW and the non-synchronous injection start timing Ins with the reference value efaser is defined is stored in the ROM 54 separately for the multiple injection process and the single injection process and map calculation for the reference value efaser is performed by the CPU 52 separately for the multiple injection process and the single injection process.

In the above-described embodiment, the CPU 52 selects whether or not to use the multiple injection correction coefficient Km (S16) only in the case in which the initial value of the collection amount increase ratio efase1 is set when fuel injection is started based on the amount of fresh air (S12). Instead, for example, in a case in which the single injection process that was performed when starting fuel injection based on the amount of fresh air is switched to the multiple injection process halfway, the multiple injection correction coefficient Km may be used to correct the collection amount increase ratio efase1. Further, for example, in a case in which the multiple injection process that was performed when starting fuel injection based on the amount of fresh air is switched to the single injection process halfway, the collection amount increase ratio efase1 may be multiplied by the inverse of the multiple injection correction coefficient Km to correct the collection amount increase ratio efase1.

In the above-described embodiment, the initial value of the collection amount increase ratio efase1 calculated through the process of S14 is set to be suitable for the single injection process. Instead, the initial value of the collection amount increase ratio efase1 calculated through the process of S14 may be set to be suitable for the multiple injection process. In this case, when a negative determination is made in the process of S16, a correction coefficient used to set an initial value suitable for the single injection process may be multiplied. In this case, the correction coefficient is greater than 1.

Updating Process

In the above-described embodiment, the damping coefficient Kd is a fixed value. Instead, for example, the damping coefficient Kd may be variably set in accordance with the water temperature THW. Alternatively, for example, the damping coefficient Kd may be set separately for the single injection process and the multiple injection process.

In the above-described embodiment, the damping coefficient Kd is multiplied by the collection amount increase ratio efase1 every time injection is performed in each cylinder. Instead, for example, the damping coefficient Kd may be multiplied by the collection amount increase ratio efase1 every time two cylinders reach the compression top dead center. Alternatively, for example, the damping coefficient Kd may be multiplied by the collection amount increase ratio efase1 once in 360° C. A. As another option, for example, the damping coefficient Kd may be multiplied by the collection amount increase ratio efase1 once in a single combustion cycle.

Increasing Correction Process

In the above-described embodiment, in S14, the initial value of the collection amount increase ratio efase1 is variably set in accordance with the water temperature THW, the non-synchronous injection start timing Ins, and the rotation speed NE. Instead, for example, the initial value of the collection amount increase ratio efase1 may be variably set based on only one of the three parameters, namely, the water temperature THW, the non-synchronous injection start timing Ins, and the rotation speed NE. As another option, for example, the initial value of the collection amount increase ratio efase1 may be variably set based on only two of the three parameters.

The process of gradually decreasing the collection amount increase ratio efase1 does not have to be a process of updating the damping coefficient Kd in accordance with the number of times injection is performed. Instead, for example, the process of gradually decreasing the collection amount increase ratio efase1 may be a process of subtracting, from the initial value of the collection amount increase ratio efase1, a low-pass filter process value in which the initial value is a stationary input and then setting the subtracted value to a final collection amount increase ratio efase1.

Correction Process of Base Injection Amount

In the above-described embodiment, in S28, the collection amount increase ratio efase1, the torque step limiting increase ratio efase2, and the low-temperature increase ratio fw1 are taken as examples of elements that correct the base injection amount Qb. Instead, for example, an air-fuel ratio sensor may be arranged in the exhaust passage 32. In this case, a correction ratio serving as an operation amount for performing feedback control in order to set the detection value of the air-fuel ratio sensor to be a target value is further used as an element that corrects the base injection amount Qb.

Intake Air Synchronous Injection

In the above-described embodiment, in the intake air synchronous injection, the synchronous injection start timing Is is set immediately before the intake valve 18 opens as an example. Instead, the synchronous injection start timing Is may be set after the intake valve 18 starts opening and when the intake valve 18 is open.

The intake air synchronous injection may be a process of calculating the synchronous injection start timing Is and then determining the injection end timing with the synchronous injection start timing Is. Instead, for example, the intake air synchronous injection may be a process of calculating the reach end timing, which is the target value of a timing at which fuel injected at the latest timing in the fuel injected from the port injection valve 16 reaches a position during the closing period of the intake valve 18 and then calculating the synchronous injection start timing Is based on the reach end timing, the synchronous injection amount Qs, and the rotation speed NE. Even in this case, it is desired that the intake air synchronous injection be a process of injecting fuel in synchronization with the opening period of the intake valve 18.

More specifically, the intake air synchronous injection is to inject fuel such that a period during which fuel injected from the port injection valve 16 reaches a position before the intake valve 18 opens is within the opening period of the intake valve 18. The starting point of the reach period refers to a timing at which the fuel injected at the earliest timing in the fuel injected from the port injection valve 16 reaches the position before the intake valve 18 opens, and the ending point of the reach period refers to a timing at which the fuel injected at the latest timing in the fuel injected from the port injection valve 16 reaches the position before the intake valve 18 opens. The intake air non-synchronous injection is to inject fuel from the port injection valve 16 such that the fuel injected from the port injection valve 16 reaches the intake valve 18 before the intake valve 18 opens. In other words, in the intake air non-synchronous injection, the fuel injected from the port injection valve 16 remains in the intake passage 12 until the intake valve 18 opens and the fuel flows into the combustion chamber 24 after the intake valve 18 opens. More specifically, it is desired that the intake air non-synchronous injection be to inject fuel from the port injection valve 16 such that a period during which fuel injected from the port injection valve 16 reaches the position before the intake valve 18 opens is within the opening period of the intake valve 18.

Figure 12A:
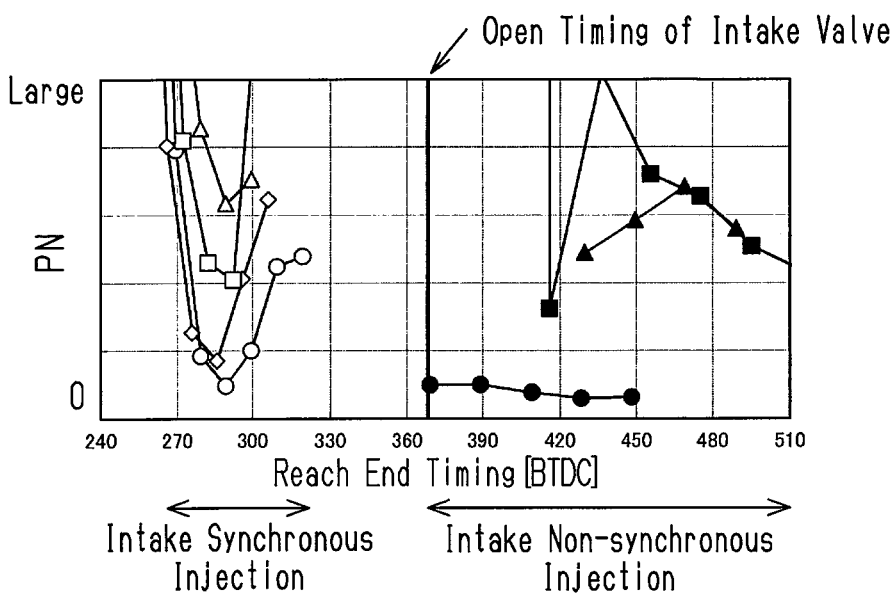
FIG. 12A is a graph illustrating the relationship between PN and a reach end timing of the multiple injection process.
Figure 12B:
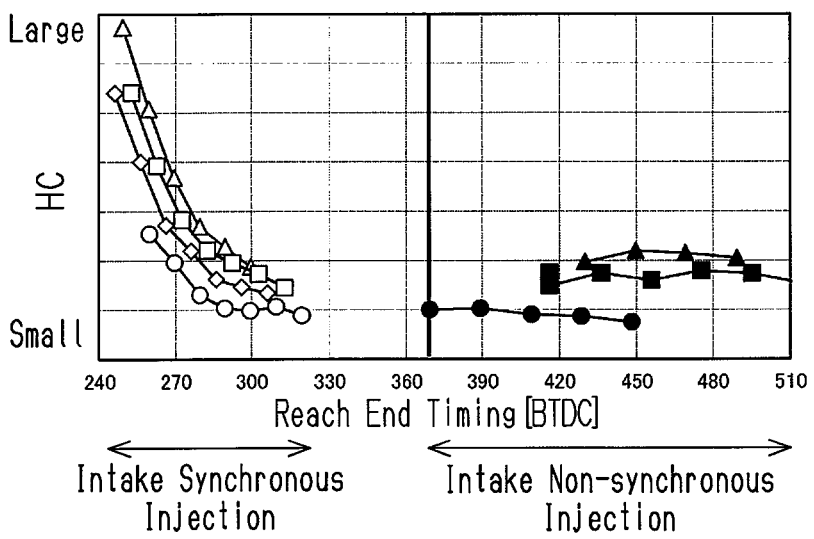
FIG. 12B is a graph illustrating the relationship between the generation amount of HC and a reach end timing of the multiple injection process.

FIG. 12A shows PN when the reach end timings of the intake air non-synchronous injection and the intake air synchronous injection are changed. FIG. 12B shows the generation amount of HC when the reach end timings of the intake air non-synchronous injection and the intake air synchronous injection are changed. In FIGS. 12A and 12B, white plotted points indicate parameters in which the reach end timing of the intake air non-synchronous injection is fixed and the reach end timing of the intake air synchronous injection is changed, and black plotted points indicate parameters in which the reach end timing of the intake air synchronous injection is fixed and the reach end timing of the intake air non-synchronous injection is changed. The circle plotted points, diamond plotted points, square plotted points, and triangle plotted points respectively correspond to 8:2, 7:3, 6:4, and 5:5 in the ratio of the non-synchronous injection amount Qns and the synchronous injection amount Qs.

As shown by the white plotted points in FIGS. 12A and 12B, when the reach end timing of the intake air synchronous injection changes, the generation amounts of PN and HC change greatly.

Single Injection Process

In the above-described embodiment, the single injection process is to end all fuel injections before the intake valve 18 opens. Instead, for example, when the base injection amount Qb is large, the end timing of injection from the port injection valve 16 may be more retarded than the open timing of the intake valve 18. Even in this case, it is desired that fuel injection be performed as much as possible prior to the open timing of the intake valve 18.

Splitting Process of Requested Injection Amount Qd

In the above-described embodiment, the rotation speed NE, the charging efficiency the water temperature THW, and the intake phase difference DIN are used to split the requested injection amount Qd of fuel into the synchronous injection amount Qs and the non-synchronous injection amount Qns. Instead, for example, the requested injection amount Qd may be used instead of the charging efficiency η as a load parameter, which is the parameter that indicates the amount of fresh air filling the combustion chamber 24. In addition, splitting of the requested injection amount Qd may be variably set based on only one, two, or three of four parameters, namely, the load parameter, the rotation speed NE, the water temperature THW, and the intake phase difference DIN. Intake pressure or the flow speed of intake air may be used instead of the four parameters, which can be used to obtain intake pressure or the flow speed of intake air.

Characteristic Variable Device for Intake Valve

The characteristic variable device that changes the characteristics of the intake valve 18 is not limited to the intake valve timing adjusting device 44. For example, the characteristic variable device may be a device that changes the lift amount of the intake valve 18. In this case, the parameter that indicates the valve characteristics of the intake valve 18 is, for example, a lift amount instead of the intake phase difference DIN.

Controller

The controller does not have to include the CPU 52 and the ROM 54 to execute software processing. For example, at least part of the processes executed by the software in the above-described embodiment may be executed by hardware circuits dedicated to executing these processes (such as ASIC). That is, the controller may be modified as long as it has any one of the following configurations (a) to (c): (a) A configuration including a processor that executes all of the above-described processes according to programs and a program storage device such as a ROM (including a non-transitory computer readable medium) that stores the programs; (b) A configuration including a processor and a program storage device that execute part of the above-described processes according to the programs and a dedicated hardware circuit that executes the remaining processes; and (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not necessarily have to include a characteristic variable device that changes the characteristics of the intake valve 18. The internal combustion engine 10 does not necessarily have to include the throttle valve 14.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine comprising a port injection valve that injects fuel into an intake passage, the controller being configured to execute:

a base injection amount calculation process for calculating a base injection amount in accordance with an amount of fresh air filling a combustion chamber of the internal combustion engine;

an increasing correction process for increasing the base injection amount over a predetermined period after the internal combustion engine is started and gradually decreasing an increase correction ratio of the base injection amount; and a fuel injection process for selecting and executing one of two processes, a multiple injection process and a single injection process, in order to inject the increased base injection amount of fuel, wherein the multiple injection process is to sequentially execute an intake air synchronous injection and an intake air non-synchronous injection by operating the port injection valve in order from the intake air non-synchronous injection to the intake air synchronous injection, the single injection process is to inject the increased base injection amount of fuel by operating the port injection valve through the intake air non-synchronous injection, the intake air synchronous injection is to inject fuel in synchronization with an opening period of an intake valve, and the intake air non-synchronous injection is to inject fuel at a more advanced timing than a timing of the intake air synchronous injection, wherein the increasing correction process includes a differentiation process for setting the increase correction ratio to be a smaller value in the multiple injection process than in the single injection process.

2. The controller according to claim 1, wherein the increasing correction process includes a stop time reflection process for setting the increase correction ratio to be a larger value when a time between a start timing of the internal combustion engine and a stop timing of the internal combustion engine, which is immediately before the start timing, is long than when the time is short.

3. The controller according to claim 1, wherein the increasing correction process includes a rotation correction process for setting the increase correction ratio to be a smaller value when a rotation speed of a crankshaft of the internal combustion engine is high than when the rotation speed is low.

4. The controller according to claim 1, wherein the increasing correction process includes a process for setting the increase correction ratio to be a smaller value when an injection start timing of the intake air non-synchronous injection is advanced than when the injection start timing is retarded.

5. The controller according to claim 1, wherein the controller is further configured to execute, in addition to the increasing correction process, a low-temperature increasing process for increasing the base injection amount to be larger when a temperature of the internal combustion engine is low than when the temperature is high in a case in which the temperature of the internal combustion engine is less than or equal to a preset temperature.

6. The controller according to claim 1, wherein
the increasing correction process includes
an initial value calculation process for calculating an initial value of the increase correction ratio,
an updating process for updating the increase correction ratio by gradually decreasing the initial value as a number of times injection from the port injection valve is performed increases, and
a correction process for correcting the base injection amount based on the increase correction ratio, and
the multiple injection process is a process for splitting the increased base injection amount of fuel into fuel injected through the intake air non-synchronous injection and fuel injected through the intake air synchronous injection and injecting the fuel injected through the intake air non-synchronous injection and the fuel injected through the intake air synchronous injection.

7. The controller according to claim 1, wherein the single injection process is a process for operating the port injection valve such that a center of an injection period of the intake air non-synchronous injection is prior to an open timing of the intake valve.

8. A control method for controlling an internal combustion engine, the internal combustion engine including a port injection valve that injects fuel into an intake passage, the control method comprising:
calculating a base injection amount in accordance with an amount of fresh air filling a combustion chamber of the internal combustion engine;
increasing the base injection amount over a predetermined period after the internal combustion engine is started;
gradually decreasing an increase correction ratio of the base injection amount;
selecting and executing one of two processes, a multiple injection process and a single injection process, in order to inject the increased base injection amount of fuel, wherein the multiple injection process is to sequentially execute an intake air synchronous injection and an intake air non-synchronous injection by operating the port injection valve in order from the intake air non-synchronous injection to the intake air synchronous injection, the single injection process is to inject the increased base injection amount of fuel by operating the port injection valve through the intake air non-synchronous injection, the intake air synchronous injection is to inject fuel in synchronization with an opening period of an intake valve, and the intake air non-synchronous injection is to inject fuel at a more advanced timing than a timing of the intake air synchronous injection; and
setting the increase correction ratio to be a smaller value in the multiple injection process than in the single injection process.

9. A non-transitory computer-readable storage medium that stores a program causing a processor to execute a control process for controlling an internal combustion engine, the internal combustion engine including a port injection valve that injects fuel into an intake passage, the control process comprising:
calculating a base injection amount in accordance with an amount of fresh air filling a combustion chamber of the internal combustion engine;
increasing the base injection amount over a predetermined period after the internal combustion engine is started;
gradually decreasing an increase correction ratio of the base injection amount;
selecting and executing one of two processes, a multiple injection process and a single injection process, in order to inject the increased base injection amount of fuel, wherein the multiple injection process is to sequentially execute an intake air synchronous injection and an intake air non-synchronous injection by operating the port injection valve in order from the intake air non-synchronous injection to the intake air synchronous injection, the single injection process is to inject the increased base injection amount of fuel by operating the port injection valve through the intake air non-synchronous injection, the intake air synchronous injection is to inject fuel in synchronization with an opening period of an intake valve, and the intake air non-synchronous injection is to inject fuel at a more advanced timing than a timing of the intake air synchronous injection; and setting the increase correction ratio to be a smaller value in the multiple injection process than in the single injection process.

* * * * *